(12) United States Patent
Keeton et al.

(10) Patent No.: US 8,207,824 B2
(45) Date of Patent: Jun. 26, 2012

(54) TWO SIDED THERMAL RFID

(75) Inventors: Mark Keeton, Kettering, OH (US); Mohamed Fayaz S. Khatri, Cuyahoga Falls, OH (US); Gregory S. Vannatta, Kettering, OH (US); Richard D. Puckett, Miamisburg, OH (US); Patricia A. Puckett, legal representative, Miamisburg, OH (US); Michael J. VanDemark, Springboro, OH (US)

(73) Assignee: NCR Corporation, Duluth, GA (US)

( * ) Notice: Subject to any disclaimer, the term of this patent is extended or adjusted under 35 U.S.C. 154(b) by 1227 days.

(21) Appl. No.: 11/923,244

(22) Filed: Oct. 24, 2007

(65) Prior Publication Data

US 2009/0108994 A1 Apr. 30, 2009

(51) Int. Cl.
*H04Q 5/22* (2006.01)
(52) U.S. Cl. ...................................... 340/10.1
(58) Field of Classification Search .............. 340/10.1, 340/572.7, 572.8; 347/171
See application file for complete search history.

(56) References Cited

U.S. PATENT DOCUMENTS

| | | | |
|---|---|---|---|
| 5,284,816 A * | 2/1994 | Stephenson | 503/227 |
| 5,994,715 A * | 11/1999 | Ide | 257/48 |
| 6,756,880 B2 * | 6/2004 | Hartmann | 340/10.42 |
| 7,170,415 B2 * | 1/2007 | Forster | 340/572.4 |
| 7,353,598 B2 * | 4/2008 | Craig et al. | 29/846 |
| 2005/0092838 A1 * | 5/2005 | Tsirline et al. | 235/449 |

* cited by examiner

*Primary Examiner* — Vernal Brown
(74) *Attorney, Agent, or Firm* — Dana T. Hustins; Charles Q. Maney

(57) ABSTRACT

A radio frequency identification enabled dual-sided direct thermal image element and printer therefor are provided. One embodiment includes, a first substrate having an exterior side and an interior side, a radio frequency identification device attached to the interior side of the first substrate, and a second substrate having an exterior side and an interior side, wherein both the first substrate and the second substrate include a thermally sensitive coating on at least the exterior side thereof, and wherein the interior side of the second substrate is attached to the interior side of the first substrate, such that the radio frequency identification device is positioned between the first substrate and second substrate.

27 Claims, 14 Drawing Sheets

TWO SIDED THERMAL RFID

BACKGROUND

Two, or dual-sided direct thermal printing of documents such as transaction documents and receipts is described in U.S. Pat. Nos. 6,784,906 and 6,759,366, the contents of which are hereby incorporated by reference herein. In dual-sided direct thermal printing, a two-sided thermal printer is configured to allow concurrent printing on both sides of thermal media moving along a feed path through the printer. In such a printer a direct thermal print head is disposed on each side of the media along the feed path. In operation each thermal print head faces an opposing platen across the media from the respective print head.

In direct thermal printing, a print head selectively applies heat to paper or other media comprising a substrate with a thermally sensitive coating. The coating changes color when heat is applied, by which "printing" is provided on the coated substrate. For dual-sided direct thermal printing, the media substrate may be coated on both sides.

Today, components for radio frequency identification ('RFID') devices are being integrated into many types of media, such as labels, tickets, and cards. This RFID enabled media is typically pre-printed on one or both sides, and if thermal or thermal transfer printing occurs, it is printed on one side only. This limits the ability to "print on demand" useful or required information on RFID enabled media.

SUMMARY

RFID enabled dual-sided direct thermal media for dual-sided direct thermal printing and encoding and a printer therefor are described.

Generally the RFID enabled dual-sided direct thermal media comprises a RFID device embedded with a substrate having two printable sides, each with a thermally sensitive coating. In one embodiment, RFID enabled dual-sided two-ply direct thermal media is provided, comprising a first substrate having a first side and a second side, a RFID device attached to the second side of the first substrate, and a second substrate having a first side and a second side, wherein both the first substrate and the second substrate include a thermally sensitive coating on at least a first side thereof, and wherein the second side of the first substrate is attached to the second side of the second substrate, such that the RFID device is positioned between the first and second substrates.

A RFID enabled dual-sided direct thermal printer is configured to allow dual-sided printing and encoding of RFID enabled thermal media moving along a media feed path through the printer. In one embodiment, a dual-sided direct thermal printer comprises a function switch controlling operation of a first thermal print head, a second thermal print head and a RFID encoder.

Alternative features, advantages and variations of the invention will be illustrated by example by the description to follow and the appended drawings and claims.

DETAILED DESCRIPTION

By way of example, various embodiments of the invention are described in the material to follow with reference to the included drawings. Variations may be adopted.

Background material applicable to direct thermal printing and related media production and common features generally is described in U.S. Pat. No. 6,803,344, the disclosure of which is hereby incorporated herein by reference.

Figure 1A:
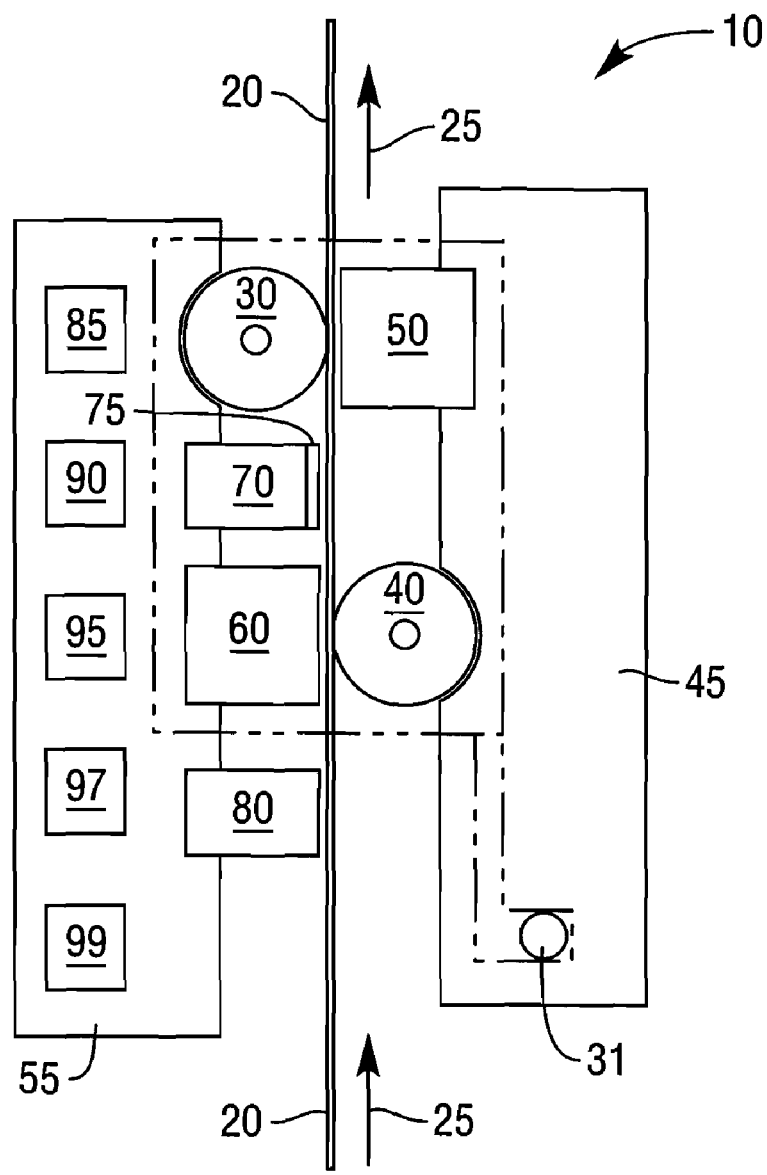
FIGS. 1A through 1D show a schematic of an example dual-sided imaging direct thermal printer useable for dual-sided, single pass printing of RFID enabled media.

FIG. 1A shows a schematic of a dual-sided imaging direct thermal printer 10 useable for dual-sided, single pass printing and encoding of RFID enabled media such as, inter alia, transaction receipts, tickets, labels, membership cards, passports and combination shipping labels/packing slips, equipped with a RFID device. The printer 10 operates on RFID thermal print media 20, or simply media 20, which is dual-sided thermal media with a RFID device embedded therein. The media 20 may be single or multi-ply, i.e. it may have one or more layers. Each ply of media may comprise a cellulose-based or polymer substrate sheet and at least the two outer sides of the media 20 are coated with heat sensitive dyes as described in U.S. Pat. Nos. 6,784,906 and 6,759,366.

Multi-color printing capability can be provided on both sides of the RFID thermal print media 20 by using two or more dyes with sensitivity to different temperatures on a side where multi-color printing is desired. Substrates and heat sensitive color changing coatings for direct thermal printing media are generally well known in the art. Dual-sided direct thermal printing can be facilitated by the media 20 which includes dyes sensitive to different temperatures on opposite sides of the media 20, or by use of thermally resistant substrates to inhibit thermal printing on one side of the media 20 from affecting the coloration on the opposite side of the media 20. A more inclusive discussion of two-sided thermal media is included in U.S. application Ser. No. 11/682,497 which is hereby incorporated by reference herein.

Figure 3A:
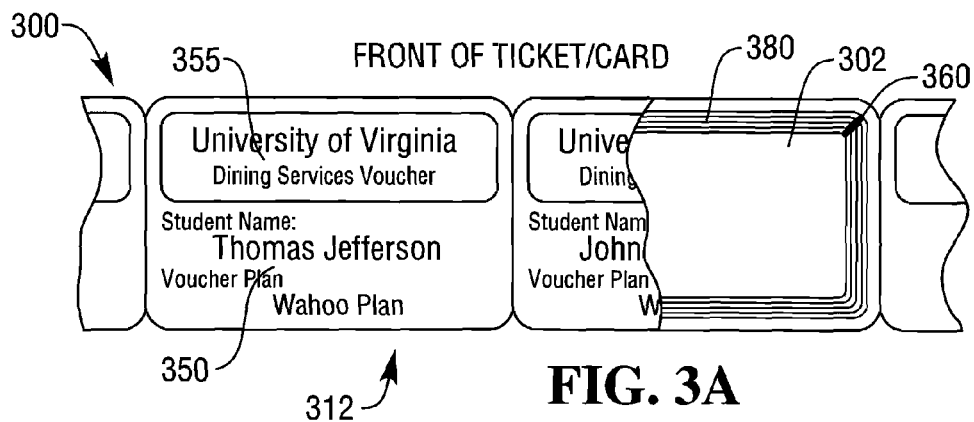
FIGS. 3A through 3C show an example of a RFID enabled ticket with customized information printed thereon.
Figure 3B:
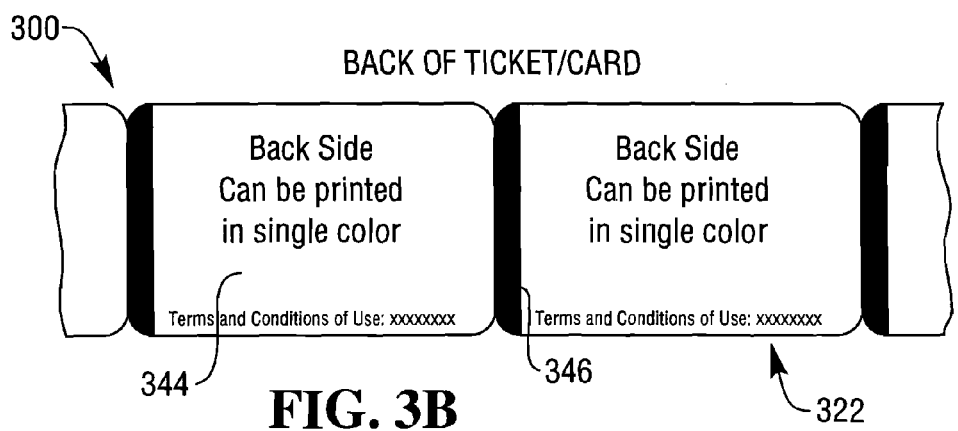
Figure 3C:
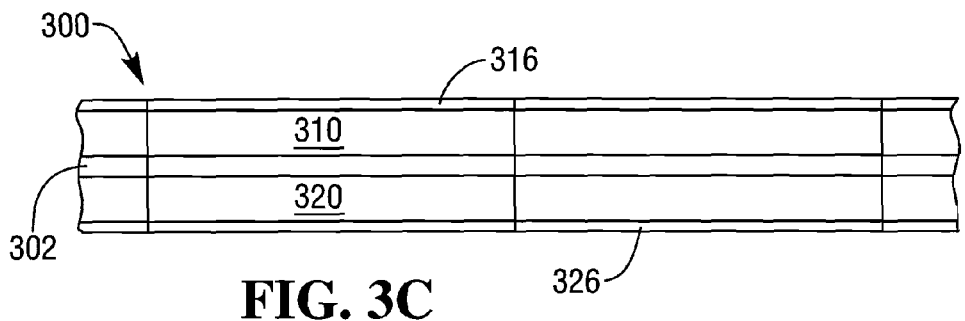
Figure 4:
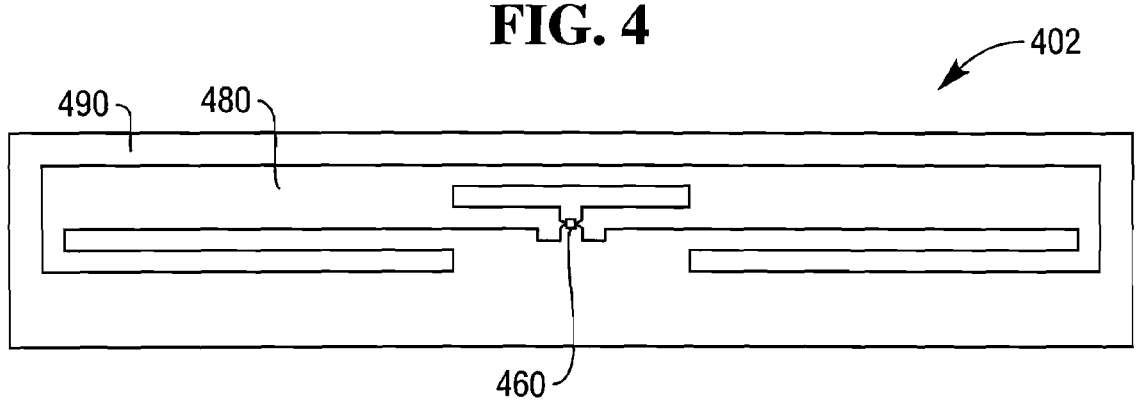
FIG. 4 shows a schematic of an example RFID device.

It will be appreciated that "RFID device" typically, but not always, refers to various forms of an integrated circuit 460 electrically attached to an antenna 480, such as a RFID tag or RFID inlay 402, as shown in FIG. 4. The integrated circuit, typically a silicon based microchip 460, may be operable to store and process information, modulate and demodulate radio frequency signals and various other specialized functions. The antenna 480 is operable to receive and transmit the radio frequency signals. As show in FIG. 4, RFID device 402 further includes a substrate 490. Various other components may be included in the RFID device 402 as needed to enable these operations. FIG. 3 shows an alternative RFID inlay 302, which includes microchip 360 and antenna 380.

RFID tags typically come in three general varieties: passive, active, or semi-passive (also known as battery-assisted). Passive tags require no internal power source, whereas semi-passive and active tags require a power source, usually a small battery.

Due to there simplicity of design, i.e. they have no internal power supply, passive RFID tags are best suited for use in the present invention, though in some embodiments other types of tags may be used. Similarly, due to their size, passive UHF and HF tags are typically chosen for use in most embodiments of the present invention. A passive tag is only active when a reader (also known as an interrogator) interrogates the tag by transmitting a radio frequency signal which induces a minute electrical current in the antenna providing enough power for the integrated circuit in the tag to power up and transmit a response back to the reader via the antenna. Most passive tags signal by backscattering the carrier wave from the reader. This means that the antenna has to be designed to both collect power from the incoming signal and also to transmit the outbound backscatter signal. The response of a passive RFID tag may be just an ID number or if the chip contains non-volatile memory, such as EEPROM, the response may contain other data. Due to their simplicity in design passive tags may utilize a printed antenna. Similarly, some RFID tags may include non-silicon chips, such as polymer semiconductors, which may be printed directly onto a substrate.

"RFID inlay" (also referred to as inlet) generally refers to a form of RFID device where the integrated circuit and antenna are mounted on a substrate. Typically, an inlay is ready to be converted into a RFID enabled label, such as a smart label. Similarly, "RFID tag" (also referred to as a transponder) generally refers to a microchip attached to an antenna that is packaged in a way that it can be applied to an object. For the purposes of this discussion both of these terms will be considered within the meaning of RFID device.

It will further be appreciated that for the purposes of this discussion the meaning of "RFID device" will encompass similar devices, such as, chipless RFID tags and electronic article surveillance ("EAS") tags. Typically, these devices are preprogrammed, as they generally can not be encoded or programmed by a printer at the time media 20 is being printed. EAS tags include acousto-magnetic, electromagnetic, radio frequency tags.

It will be appreciated that there are many variations of RFID devices, and related systems used to read, detect, encode, program, manufacture, and process the information obtained therefrom.

FIG. 1A shows printer 10 in a closed operation position. As shown printer 10 has thermal print heads 50, 60, one disposed on each side of a media feed path 25. On opposite sides of the media feed path across from the thermal print heads 50 and 60 are opposing rotating platens 30 and 40, respectively. Printer 10 may also include one or more sensors 80 and a RFID encoder 70 positioned along the media feed path 25. Typically, sensor 80 is in the form of an optical sensor, though various other types of sensors, or combinations thereof, may be used.

As shown, thermal print head 60, platen 30, RFID encoder 70 and sensor 80 are coupled to a supporting arm or base structure 55. Similarly, thermal print head 50 and platen 40 are coupled to a pivotable supporting arm or cover 45, which is operable to pivot about a hinge point 31 allowing the support arms 55 and 45 to pivot relative to each other between a closed position (as shown in FIG. 1A) and an open position, which allows paper replacement and servicing.

Typically, printer 10 may further include control electronics for controlling and/or facilitating the operation of the printer 10. The control electronics may include a motherboard 85, a controller (or simply processor 90), a communications controller (or simply communications module 95), a function switch 97 and a memory 99 (including one or more DRAM and/or NVRAM print buffer memory elements). While these components are shown coupled to the base structure 55, in other embodiments they can be located anywhere on the printer or associated host computer.

Figure 1B:
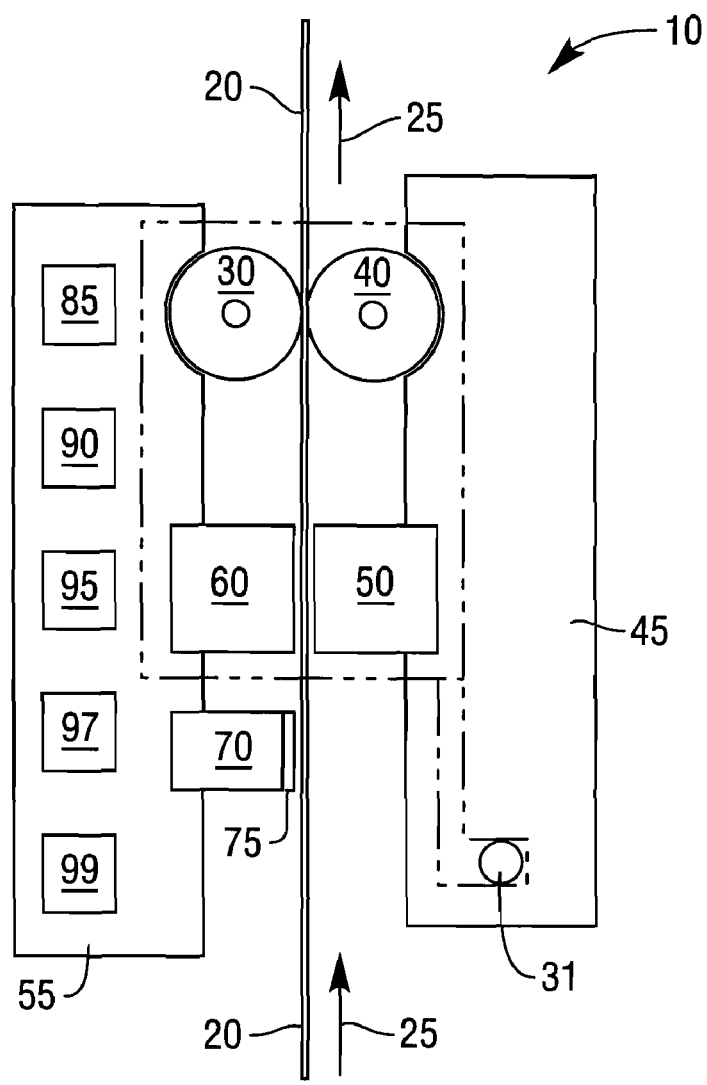
Figure 1C:
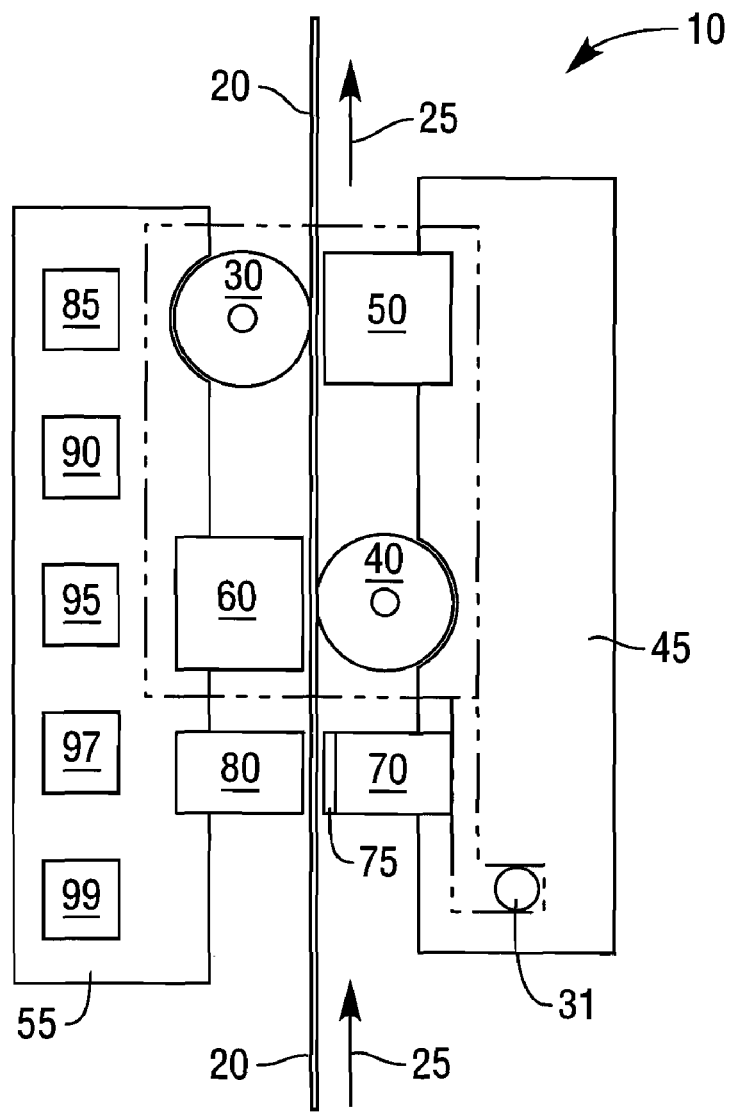
Figure 1D:
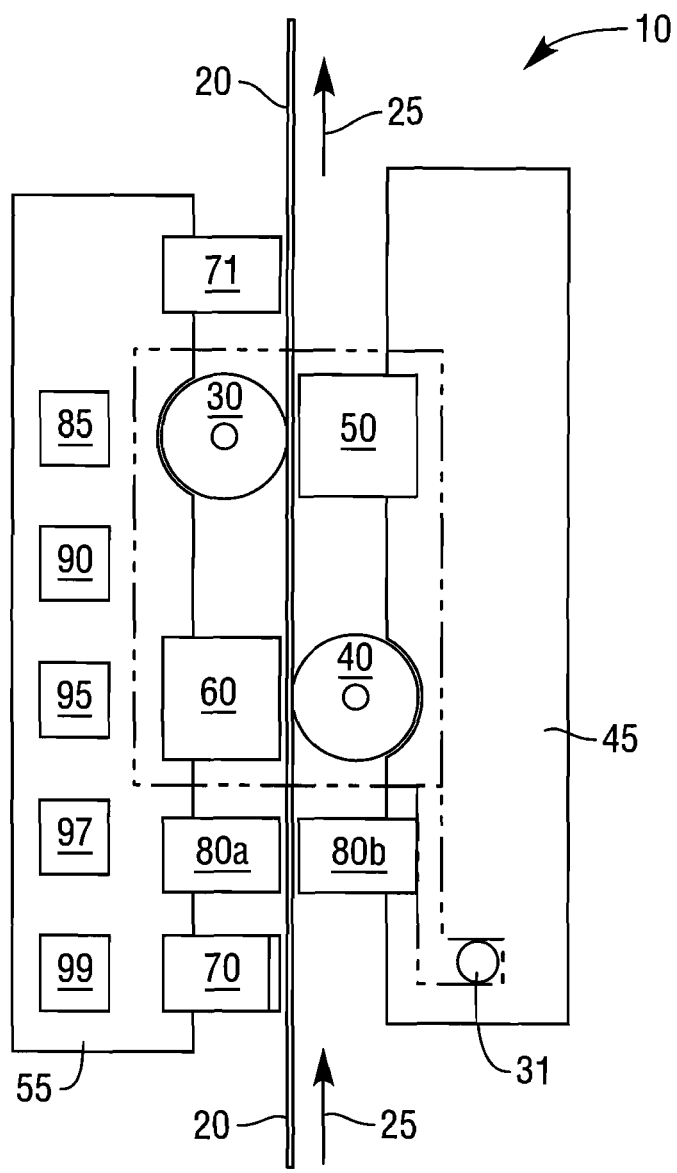

It will be appreciated that the configuration of printer 10, as shown in FIG. 1A, is by way of example and that various other printer configurations are within the scope of the present invention, a few of which are shown in FIGS. 1B through 1D. For example, the location of the thermal print heads 50, 60 and platens 30, 40 may vary as needed as disclosed in, for example, U.S. patent application Ser. No. 11/678,216 entitled "Two-Sided Thermal Print Configurations" and filed on Feb. 23, 2007, the contents of which are hereby incorporated by reference herein. One such configuration is show in FIG. 1B, where thermal print head 50 opposes thermal print head 60 and platen 30 opposes platen 40.

Similarly, FIG. 1A shows the RFID encoder 70 located between the rotating platen 30 and thermal print head 60, however, this device can be located anywhere, in or out of printer 10, so long as the encoder antenna 75 is located within close proximity to the media 20, i.e. along the media feed path 25. For example, FIG. 1B shows encoder 70 positioned along the media feed path before either of the thermal print heads 50, 60. Similarly, FIG. 1C shows encoder 70 mounted on supporting arm 45 and positioned along the media feed path before either of the thermal print heads 50, 60. In another embodiment, FIG. 1D shows encoder 70 positioned along the media feed path 25 before either of the thermal print heads 50, 60 and an additional RFID reader 71 positioned along the media feed path 25 after the thermal print heads 50, 60.

In some embodiments the sensor 80 may be positioned on the other side of the media feed path, and in others one or more sensors 80 may be positioned on both sides of the media feed path. For example, FIG. 1D shows sensor $80_a$ positioned on one side of the media feed path 25 and sensor $80_b$ on the other.

In still other embodiments alternative mechanisms may be used to move media 20 along the media feed path 25. The printer 10 may also be equipped with additional components, such as a cutting module (not shown) for cutting or severing the media 20.

In will be appreciated that there is a possibility that the RFID device may be damaged during the printing process. This is often due to the fact the media is substantially thicker at the location of the RFID chip. Typically, the force exerted on the media 20 by the print heads 50, 60 and the rotating patens 30, 40 is spread out over the entire width of the media 20, or a substantial portion thereof, however, when the print heads or the platens reach the location of the RFID chip the force exerted by the them is focused on the RFID chip. Sometimes this will damage the RFID device. In some embodiments this risk is lessened by placing a notch in one or both of the thermal print heads 50, 60 and/or one or both of the platens 30, 40. The notches are oriented so that the RFID chip passes through them, thereby lessening the force exerted on the RFID chip by them. Other embodiments may lessen the force exerted on the RFID chip by including platens that include a softer material with less durometr then a typical platen. Similarly, one or both of the print heads 50, 60 may be pull away from the media 20 at the location of the RFID device.

Some embodiments may lack one or more of the motherboard 85, the processor 90, the communications module 95, the function switch 97 and/or the memory 99, and the functions they carry out may be handled by an associated host computer.

In operation the media 20 may be supplied to the printer 10 in the form of a paper roll, fan-fold stack, individual sheet and the like. Dual-sided direct thermal printing and encoding of the media 20 typically occurs in a single pass through the printer 10. The rotating platens 30 and 40 operate to advance the media 20 along the media feed path 25 past the senor 80, the encoder 70 and thermal print heads 50 and 60.

The sensor 80 may be used to detect various attributes of the media 20, such as regions or locations of preprinted information, boundaries of individual documents, and/or regions or locations demarked by one or more sense marks. Alternately or additionally, one or more sensors 80 may be used to identify a location of a RFID device (or a microchip associated therewith) included with the media 20 by virtue of one or more physical (e.g., size, thickness, protrusion, and the like)

and/or electrical (e.g., read and/or write response, conductivity, signal, power consumption, and the like) characteristics thereof.

Typically, the printer 10 utilizes the information obtained from the sensor 80 to facilitate processing of the media 20. Based on the detected attribute and/or the location of the attribute, the printer 10 determines a region or location on the dual-sided direct thermal image element on which to perform a printer function, such as directing the print heads 50 and 60 to each print the appropriate regions of the media 20, directing the encoder 70 to encode the RFID device once it has been moved in registration with the encoder antenna 75, and/or directing a cutting module (if the printer is so equipped) to cut the media 20 in the appropriate location. Typically, the encoder 70 first reads the RFID device both prior to and after encoding of an RFID device. The first read is performed to determine if the RFID device is properly functioning, and the second read is performed to determine if the RFID device has been properly encoded.

In most embodiments the media is printed in a single pass, though in alternative embodiments, dual-sided direct thermal printing may occur in a two or more pass process where, for example, the media 20 is imaged by one or both thermal print heads 50 and 60 when moving in a first direction, and then retracted in a second direction for further imaging by one or both thermal print heads 50 and 60 with the media moving in either the first or a second direction.

In some embodiments, sensor 80 may be operable to detect the location of the RFID device, as opposed to first detecting the location of a sense mark. Similarly, in other embodiments a single module may be used to both detect and encode the RFID device. In some embodiments the encoder 70 is operable to detect the location of the RFID device, in which case the printer may not be equipped with a sensor, as shown in FIG. 1B.

The encoder 70 is typically operable to read the RFID device embedded within the media 20. In some embodiments, printer 10 may be equipped with a separate RFID reader 71, which may, depending on the embodiment, be positioned along the media feed path before and/or after either or both of the thermal print heads 50, 60. It will be appreciated that an encoder 70 and/or reader 71 can be used to detect defective RFID device embedded in media 20. In some embodiments, upon detection of a defective RFID device the printer 10 is operable to print indicia indicating the defect (e.g., "VOID", "Failed", and the like) on the portion of the media (e.g., a particular defective RFID label) containing it. This allows the defective media to be easily located and separated from the non-defective media, so it is not deployed.

In some embodiments the encoder 70 is operable to detect a defective RFID device prior to printing and the reader 71 is operable to detect a defective RFID device after printing. It will be appreciated that the use of reader 71 allows RFID devices damaged during the printing process to be identified. In such embodiments an additional print head may be used to print indicia indicative of its defective status. Similarly a cutting module may be used to cut the media in such a way as to indicate the defect.

In embodiments equipped with a cutting module, once printing is completed the media 20 may, depending on its format (e.g., roll, fan fold, individual sheets, and the like), be manually or automatically cut or severed to provide an individual document. Similarly, perforations or break lines may be made on the media 20, so that it can easily be separated into individual documents at a later time.

The operations carried out by the various components of the printer 10 may be controlled, directed, managed, assisted and/or facilitated by the motherboard 85, the processor 90, the communications module 95, the function switch 97 and/or the memory 99.

For example, the communications module 95 communicates with one or more host or auxiliary systems, such as a POS terminal (not shown), for input of data to, and output of data from, the printer 10. Communication module 95 may support USB, Ethernet and/or wireless communications (e.g., 802.11, 802.15, and IR), among others. Data for printing and encoding would typically be supplied by a host terminal (not shown) communicating with the printer 10 via the communication module 95. Supplemental data for printing, such as product and or discount coupon information can also be supplied by, for example, a network server (not shown) providing data directly to the printer 10 using the communication module 95, or indirectly through the host terminal.

The memory 99 of the dual-sided direct thermal printer 10 may have a predefined data storage area to store one or more blocks of predefined data to be repetitively printed on one or both sides of the print media or encoded on the RFID device embedded therein. The blocks of predefined data may comprise, for example, a store identifier, a logo, a coupon, an advertisement, a unique number, product information, information to facilitate the tracking of an article, and the like. The predefined data may be printed and/or encoded along with data submitted by application software associated with the host terminal (not shown). Where multiple data blocks are stored in the predefined data storage area, the blocks may be alternatively selected for printing and/or encoding through use of the hardware or software function switch 97.

The function switch 97 may be operable to enable activation and deactivation of one or more dual-sided printing and encoding modes, functions, or operations. The function switch 97 can be a mechanically operated function switch on the printer 10, or an electronically operated function switch operated by a printer driver on an associated host computer or by firmware or software resident on the printer 10, and the like. The function switch 97 may, for example, be electronically operated in response to a command message or escape sequence transmitted to the printer 10, via the communications modules 95. Printer control language or printer job language ("PCL/PJL"), or escape commands, and the like, may be used. A printer setup configuration program setting, e.g., a setting made through a software controlled utility page implemented on an associated host computer, could also electronically operate the function switch 97 for the RFID enabled dual-sided printer 10.

In one embodiment, the dual-sided printing function switch 97 may be configured, programmed or otherwise setup to select or otherwise identify (1) data for printing and encoding (e.g., internally stored macros, externally received data, and the like), (2) which of the two thermal print heads 50 and 60 will be used to print and/or be used to print particular data, (3) whether selected data is to be printed, or the RFID device is to be encoded, when the media is moving in a first (e.g., forward) or second (e.g., backward) direction, (4) in which relative and/or absolute media location, including on which media side, particular data will be printed, (5) in which orientation (e.g., rightside-up, upside-down, angled, and the like) particular data will be printed on the media 20, (6) whether selected data is to be printed prior to, in conjunction with, or following encoding of the RFID device in the media 20, and the like.

In one embodiment, a function switch 97 may select a first portion of data for printing on a first side of thermal media 20, a second portion of data for printing on a second side of the thermal media 20, and a third portion of data for encoding the RFID device embedded in media 20. Such data may comprise data contemporaneously received by the printer 10 from a host computer or data stored in one or more memory locations 99 in the printer 10. It should be noted that data may be (1) processed for printing and encoding before receipt by or storage in the printer 10 by, for example, a host computer, (2) processed for printing and encoding after receipt by or storage in the printer 10 by, for example, the function switch 97, or a processor 90 associated with the printer 10, or (3) a combination of (1) and (2), among others. Likewise, such processing may occur before or after selection, identification and/or apportionment of the data for printing and encoding of thermal media 20 by the function switch 97.

Function switch 97 may facilitate printer 10 to be operated with legacy or other application program software developed for use with, for example, a single-sided direct thermal printer with no RFID encoding capability. In such case, the function switch 97 may be adapted to enable and/or disable dual-sided thermal media printing and/or encoding depending on, for example, whether print data is provided from a suitable dual-sided and/or RFID encoding application, or from single-sided application program software.

Depending on the embodiment, single-sided application software may conventionally submit and/or control printing of data on one media side, while a function switch 97 may enable printing of information on the opposite media side and/or encoding of an associated RFID device. This functioning would allow realization of RFID enabled dual-sided direct thermal printer benefits with legacy software, before or without having to invest in custom printing mode applications or other new application program or interface software. For example, in one embodiment, a printer 10 may receive data for printing from a single sided application program, which data may be apportioned by a function switch 97 associated with the printer 10 such that a first portion (e.g., a first half) of the data is printed on a first media side, and a second portion (e.g., a second half) of the data is printed on a second media side. An associated RFID device may similarly be encoded using information stored in one or more memories 99 associated with the printer 10, which information may further be selected based on the received print data.

In another example, printer 10 may be operated to print and encode data provided by legacy or other application program software that is not programmed with RFID encoding capability. In such case, the function switch 97 is used to enable the printer 10 to select a portion of the data received from the legacy software and encode the RFID device with the selected portion of data. Typically the selected portion of data will be a unique number, such as a transaction number associated with a retail transaction or a tracking number associated with a shipment. In another example, printer 10 may be operated to print data provided by legacy or other application program software and encode data provided by a separate program.

A more inclusive discussion of two-sided thermal printing and a printer used therefor is included in U.S. Application No. 60/779,781 entitled "Two-Sided Thermal Printing" and filed on Mar. 7, 2006, U.S. Provisional Application No. 60/779,782 entitled "Dual-Sided Thermal Printer" and filed on Mar. 7, 2006, and U.S. application Ser. No. 11/675,649 entitled "Two-Sided Thermal Print Switch" and filed on Feb. 16, 2007, the contents of which are hereby incorporated by reference herein.

FIG. 2A through 2G show various embodiments of RFID thermal print media 20 that may be printed and encoded by printer 10 or similarly equipped printer.

Figure 2A:
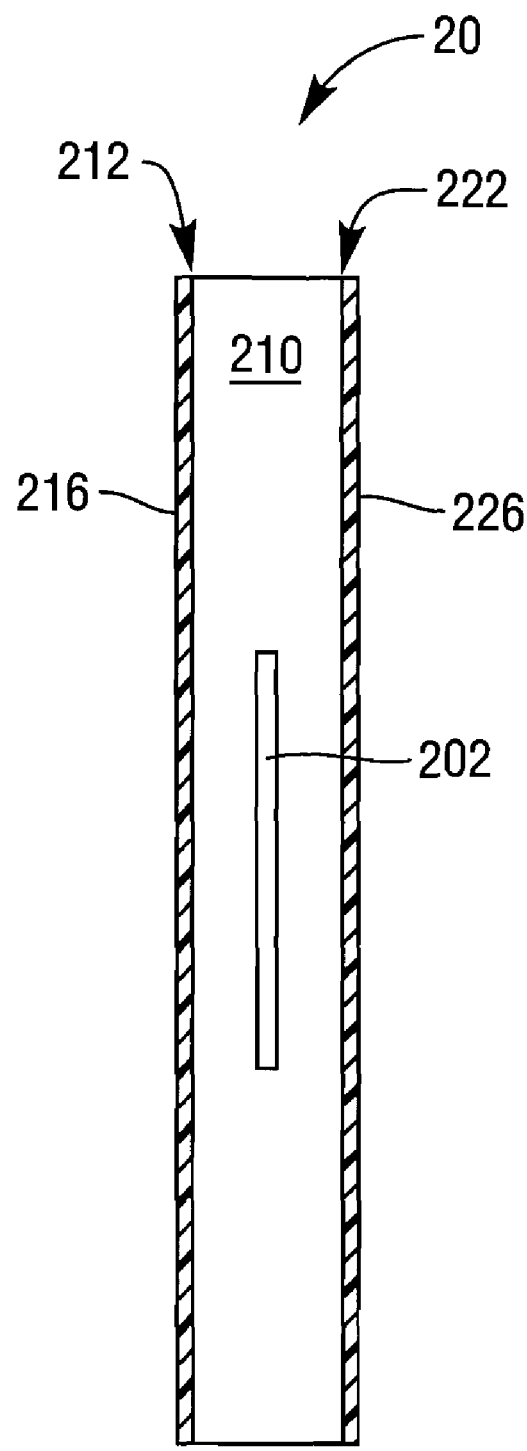
FIGS. 2A through 2H illustrate various embodiments of RFID enabled dual-sided direct thermal media.

FIG. 2A shows media 20, in the form of single-ply dual-sided direct thermal image element, which may comprise a radio frequency identification device 202 embedded within a substrate 210. The substrate 210 has a first side 212 and a second side 214, between which the RFID device 202 is disposed. As further shown in FIG. 2A, the substrate 210 includes thermally sensitive coatings 216 and 226 on each of the first side 212 and the second side 214, respectively. Each thermally sensitive coating 216, 226 may comprise a full, spot or pattern coating, and may provide for single or multi-color thermal printing. Additionally, the substrate 210 may further include one or more base and/or top coats (not shown) associated with the first side 212 and the second side 214. Where included, the one or more base and/or top coats may be provided under and/or on top of one or more included thermally sensitive coatings 216, 226.

Figure 2B:
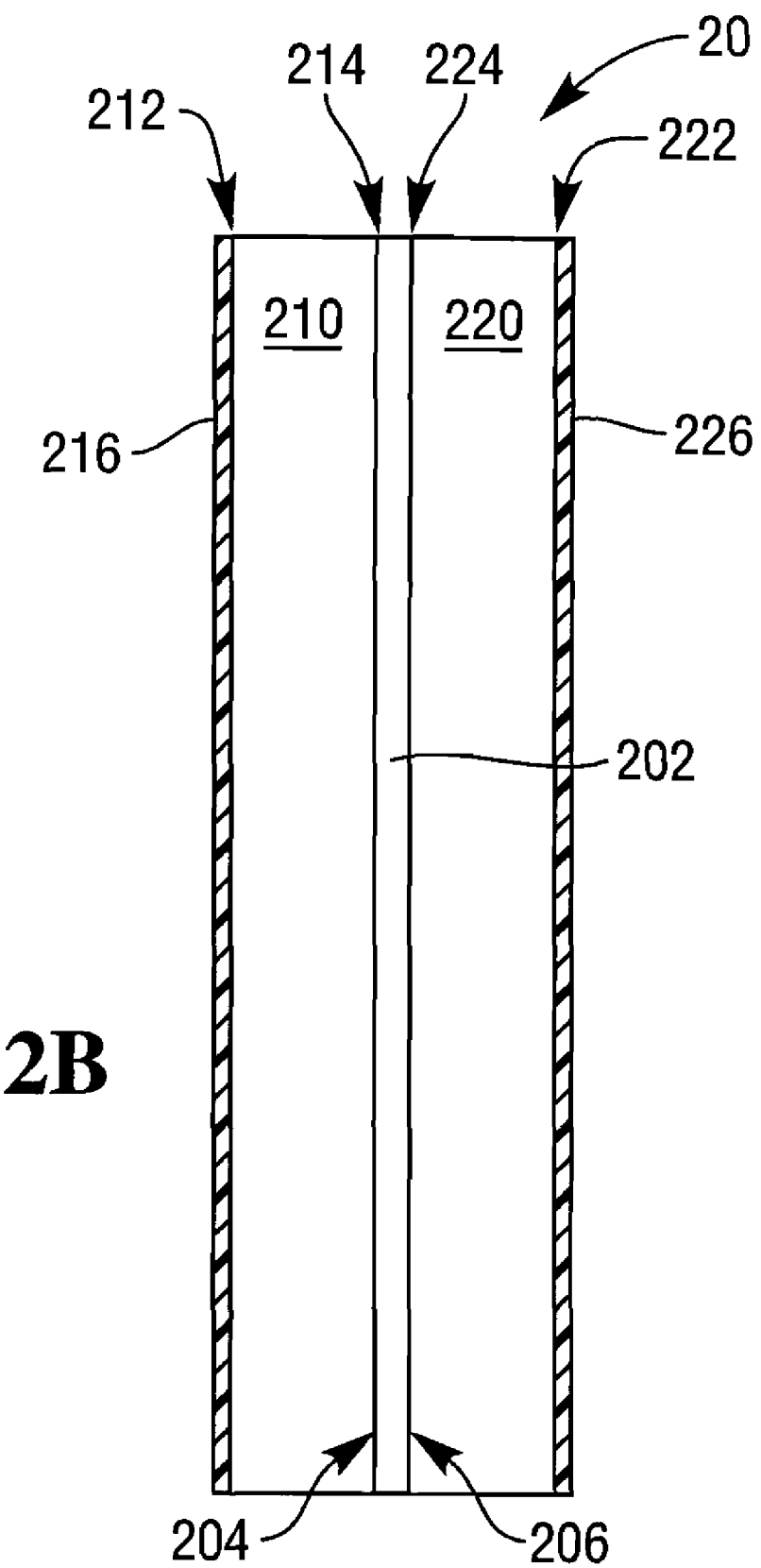

FIG. 2B shows an embodiment of RFID print media 20, in the form of a multi-ply dual-sided direct thermal image element, which may comprise a RFID device, in the form of inlay 202, laminated between a first substrate 210 and a second substrate 220. The first substrate 210 has an exterior side, or simply first side 212, and an interior side, or simply second side 214, and the second substrate 220 has an exterior side, or simply first side 222, and an interior side, or simply second side 224. Similarly the RFID inlay 202 has a first side 204 and a second side 206. The RFID inlay 202 is positioned between the first substrate 210 and the second substrate 220 such that the second side 214 of the first substrate 210 is attached to the first side 204 of the inlay 202 and the second side 224 of the second substrate 220 is attached to the second side 206 of the inlay 202. The attachment of the inlay to the substrate may be accomplished by adhesive or various other means.

As further shown in FIG. 2B, both the first substrate and the second substrate may include one or more thermally sensitive coatings 216, 226 on the first side thereof. Each thermally sensitive coating 216, 226 may comprise a full, spot or pattern coating, and may provide for single or multi-color thermal printing. Additionally, each of the first and/or second substrates 210, 220 may further include one or more base and/or top coats (not shown) associated with their respective first sides 212, 222. Where included, the one or more base and/or top coats may be provided under and/or on top of one or more included thermally sensitive coatings 216, 226.

Figure 2C:
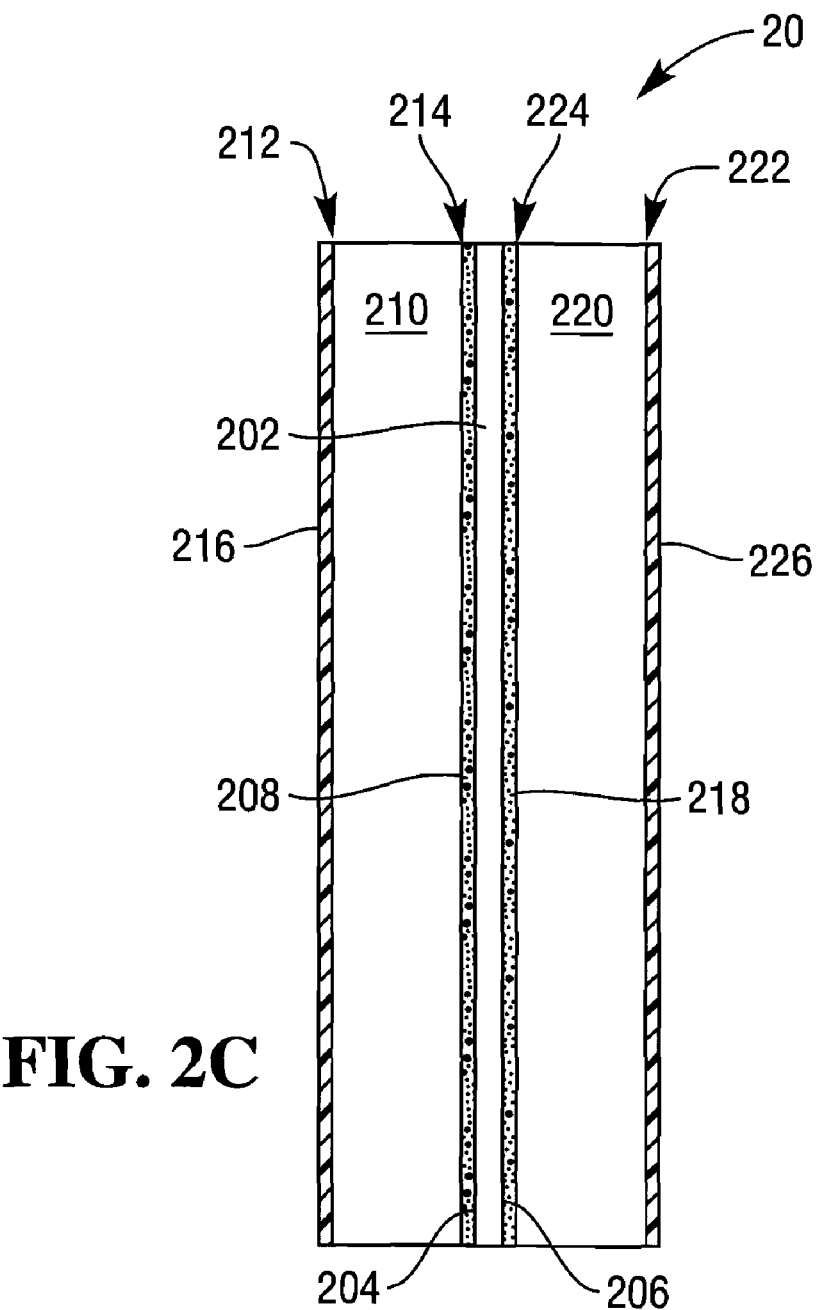

As shown in FIG. 2C, the dual-sided multi-ply direct thermal image element 20 may further comprise adhesive layers 208 and 209 for attaching, inter alia, the inlay 202 to the first substrate 210 and the second substrate 220, such that the second side 214 of the first substrate 210 is attached to the first side 204 of the inlay 202 by adhesive layer 208 and the second side 224 of the second substrate 220 is attached to the second side 206 of the inlay 202 by adhesive layer 218. In some embodiments the inlay 202 is releasably attached to one or both of the substrates. Typically, it is desirable to have the inlay 202 releasably attached to one substrate and more aggressively or permanently attached to the other. Suitable adhesives for releasably attaching a substrate include low tack adhesives which provide a low degree of residual tackiness or stickiness upon separation of the substrate from the inlay 202, and/or no residual tack adhesives which leave no residual tackiness or stickiness upon separation of the substrate, and the like. Conversely, it is desirable to utilize more aggressive or high tack adhesives for more aggressive or permanent attachment of a substrate to the inlay.

In some embodiment the RFID thermal print media 20, may be provided in the form of RFID label media. Similar, multi-ply dual-sided thermal labels that are not equipped with RFID devices are described in, inter alia, U.S. application Ser. No. 11/682,497 entitled "Dual-Sided Two-Ply Direct Thermal Image Element" and filed on Mar. 6, 2007, the contents of which are hereby incorporated by reference. It will be appreciated that RFID devices may be incorporated into any of the various embodiments of the dual-sided two-ply direct thermal image element disclosed therein.

Figure 2D:
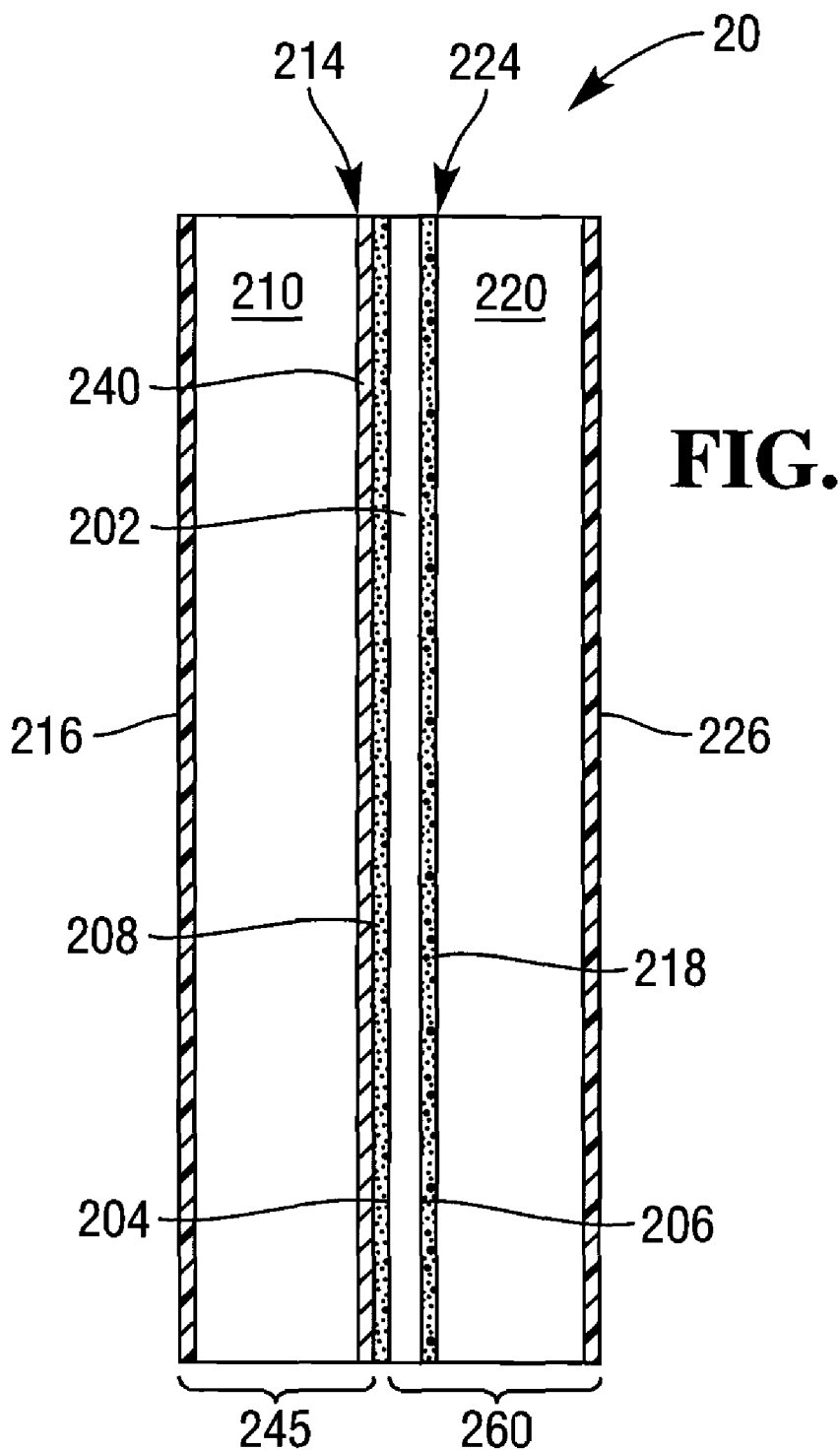

For example, FIG. 2D shows media 20 in the form of a multi-ply dual-sided direct thermal label, which may further comprise a release layer 240 applied to the second side 214 of a first substrate 210, such that it is positioned between the first substrate 210 and the adhesive layer 208. Generally, the release layer 240 includes silicone in some form, though various other materials may be used to create the release layer. The combination of the first substrate 210 and release layer 240 form a liner 245 which is releasably attached to the combination of the RFID inlay 202 and the second substrate 220, or simply RFID label 260, which are typically more aggressively or permanently adhered together. Likewise, use of a release layer 240 affords an ability to utilize high tack adhesives, as opposed to low and/or no tack adhesives, for the adhesive layer 208. It will be appreciated that this use of high tack adhesives facilitates the maintenance of residual tackiness or stickiness of the first side 204 of the inlay 202 upon removal of the RFID label 260, so that it can be adhered to a desired object, such as an article of commerce.

Figure 2E:
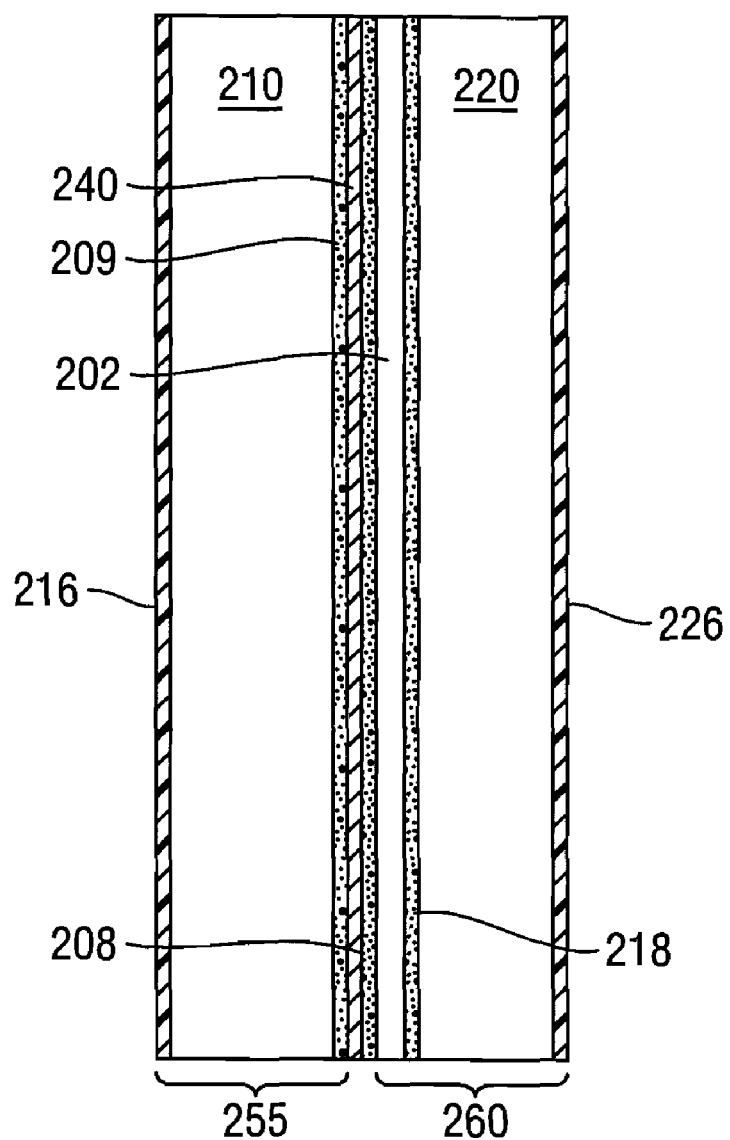

FIG. 2E shows an additional variation, where an additional adhesives layer 209 is provided between substrate 210 and release layer 240. This configuration allows removal of both the substrate 210 and the RFID label 260 from the release layer 240, such that, when removed they act as an adhesive label 255 and an adhesive RFID label 260, respectively.

Figure 2F:
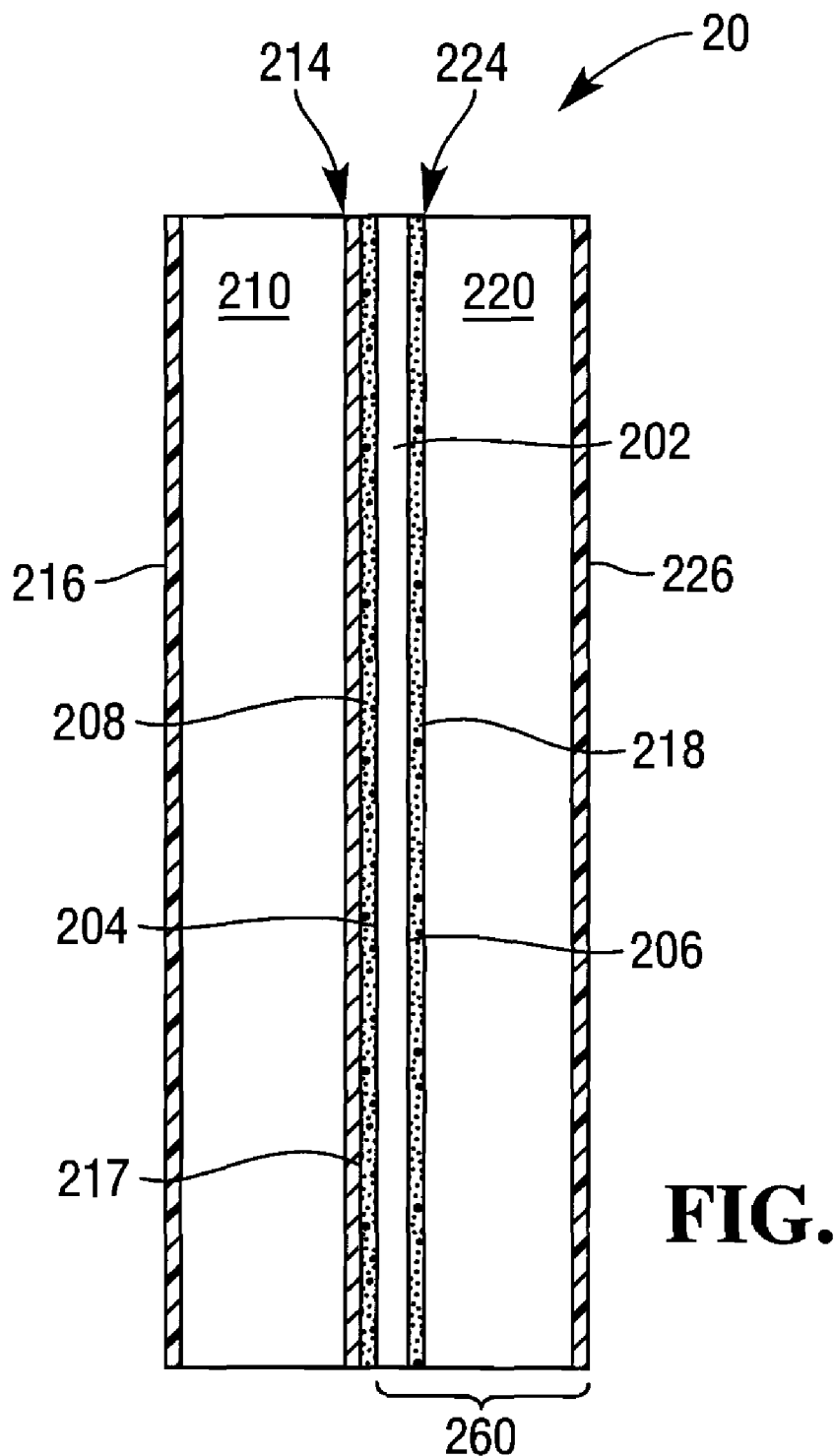

As shown in FIG. 2F, a dual-sided two-ply direct thermal image element may further comprise one or more thermally sensitive coatings 217 on a second side 214 of a first substrate 210 for imaging before, during and/or after imaging of one or both of the thermally sensitive coatings 216, 226 on the first sides of the first and second substrates 210, 220. As further shown in FIG. 2F, adhesive layer 208, in the form of a low tack adhesive, may also be provided for releasably attaching substrate 210 to the RFID label 260.

Figure 2G:
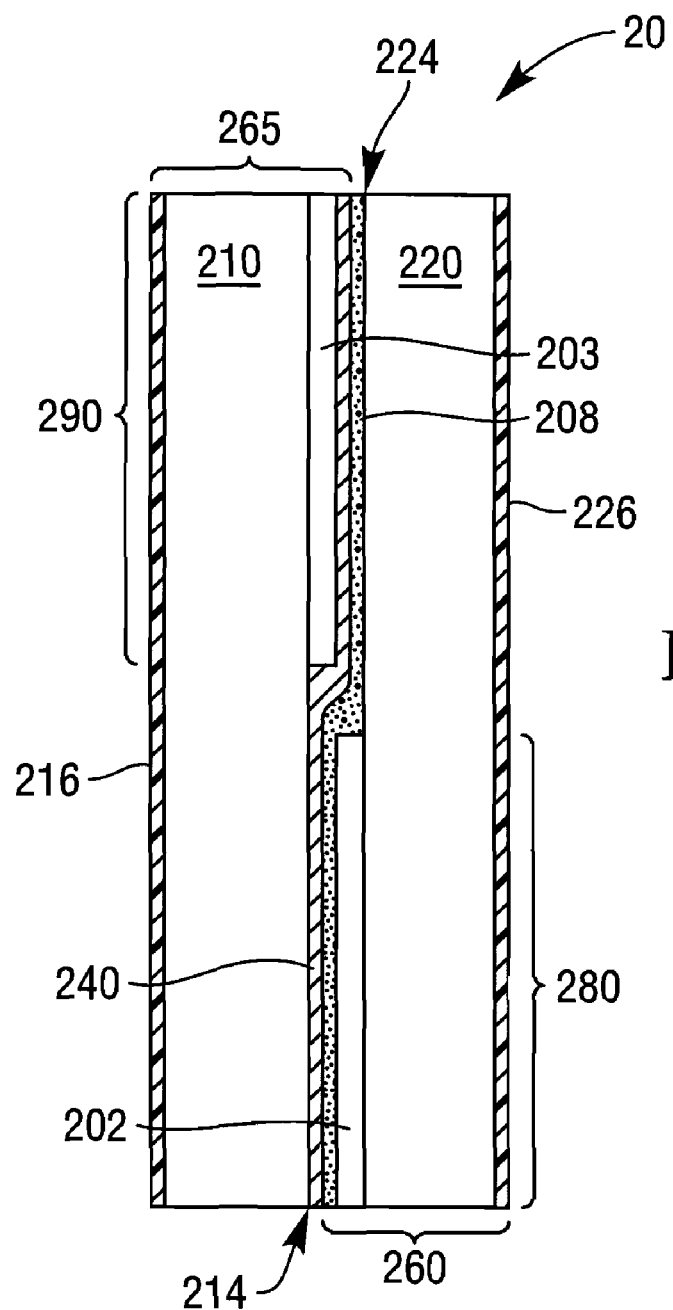

In some embodiments, the media 20, in the form of a dual-sided two-ply direct thermal image element, may further be equipped with two or more RFID devices. For example, FIG. 2G shows two RFID inlays 202 and 203, one associated with each substrate 210 and 220. Inlay 202 is attached to a width 280 of the second side 224 and inlay 203 is attached to a width 290 of the second side 214, such that with 280 and 290 do not overlap. A release layer 240 and adhesive layer 208 are positioned between the two inlays 202, 203. This configuration allows a RFID label 260 to be separated from the substrate 210 and inlay 203, or simply RFID thermal print document 265.

Typically, each of the substrates 210, 220 or at least necessary portions thereof are sufficiently thermally resistance to prevent heat damage to the RFID device and/or to prevent imaging of a second side of media 20 when heat is applied to the first side of media 20.

Figure 2H:
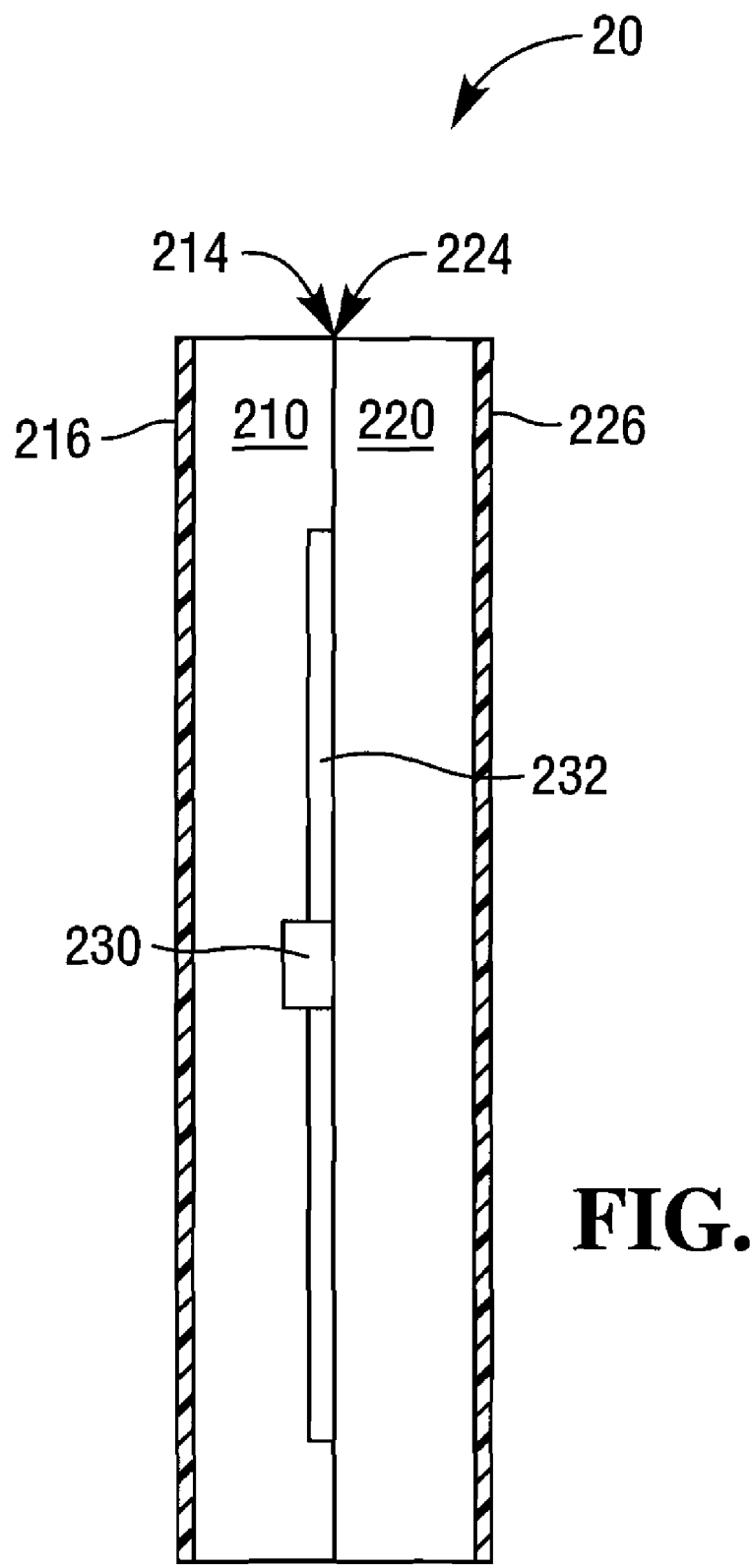

It will be appreciated that the embodiments of RFID thermal print media 20, discussed above, are merely examples and that various other embodiments fall with in the scope of the present invention. For example, FIG. 2H shows media 20 in the form of a multi-ply dual-sided direct thermal image element, where a separate inlay is not provide between the substrate 210 and 220, rather an integrated circuit 230 and antenna 232 are mounted on and/or applied to the second side 224 of substrate 220. In such an embodiment the first substrate 210 of the RFID thermal print media may be in a proximate relation to the second substrate 220 such that the second side 214 of the first substrate 210 is attached to the second side 224 of the second substrate. The substrates 210, 220 may be releasably attached or permanently affixed to each other. Similarly, to facilitate easy separation of the substrates, a release layer or liner may be applied to the second side 214 of the first substrate 210 and a layer of adhesive may be provided between the release layer and the substrate 220.

Typically, the thermal print heads used to print media 20 will not raise the temperature of the RFID device enough to damage any of the components, such as the RFID chip. However, in some embodiments an insulating resin and/or clay are utilized to insulate portions of the RFID device that may be sensitive to heat. Generally, such an insulating material will be placed one or more sides of the RFID chip, as it tends to be the most heat sensitive part of the RFID device.

In still other embodiments of the thermal RFID media 20, the RFID device may be an EAS tag and/or a chipless RFID device. Similarly in some embodiments both plies are equipped with a RFID device.

It should be noted that a RFID enabled dual-sided direct thermal image element, such as the various embodiments discussed above, may be provided in roll, fan-fold, and/or cut sheet stock form, a finished length of which may be set through one or more manual and/or automatic cut or severing means such as, inter alia, an automatic or manual (e.g., serrated edge) knife associated with a dual-sided direct thermal printer.

It should also be noted that a RFID enabled dual-sided direct thermal image element, such as the various embodiments of media 20 discussed above, may be used for a plethora of different applications such as, inter alia, labels (e.g. for tracking, monitoring, and/or providing information on items, such as baggage checked at the airport, mail, merchandise, library books, etc.), tickets (e.g. airline and train tickets, buss passes, ski lift passes, etc.), temporary ID badges, transaction receipts, passports, combination shipping labels/packing slips, and cards (e.g. membership cards, loyalty program cards, library cards, etc.). Similarly, a RFID device may be incorporated into any of the various applications for the dual-sided two-ply direct thermal image element disclosed in U.S. application Ser. No. 11/682,497, which are herein incorporated by reference.

FIGS. 3A, 3B and 3C show an exemplary application of media 20, in the form of dual-sided thermal RFID enabled tickets 300 that have been printed and encoded by a printer, such as printer 10. As shown in FIG. 3, the ticket is a dining services voucher ticket that may be issued to a university student.

Each of the tickets 300 include an RFID device 302 laminated between a front layer 310 and a back layer 320 of thermal sensitive paper. The RFID device 302 will typically be encoded with information related to a student to which a ticket 300 has been issued. Typically this information will be a unique code that identifies an account of a specific student. This code may be read by a RFID reader maintained by the dining services operator, the code is then used to properly record the meal to the student's account. In some embodiments the meals allotted to a student may be stored on the RFID device and each time the student receives a meal the ticket is debited, i.e. the memory of the RFID device is altered to reflect the number of meals remaining.

The front layer 310 and back layer 320 of the ticket 300 include printable surfaces 312 and 322, respectively, at least partially covered with a thermally sensitive coating 316 and 326. The printable surface 312 of the front layer 310 includes a preprinted area 355 and a thermal printing area 350 printed with customized information unique to each ticket. The preprinted area 355 has indicia which indicates both the identity of the institution issuing the ticket and the purpose for which the ticket is used. As this information is identical for each ticket issued, it will typically be preprinted on each of the tickets 300. In alternate embodiments, the preprinted area 355 may be thermally printed with repetitive, static information, which information may be prestored in and retrieved from one or more memories 99 associated with the printer 10. Conversely, the thermal print area 350 is typically printed with customized information specific to the person when it is issued. As shown, the customized information includes a student's name and the type of meal plan selected by the named student. Such information will typically be provided by an application program executing on host computer associated with the printer 10.

The printable surface 322 of the back layer 320 includes a thermal printing area 344 and sense marks 346, which enable a printer to sense where a ticket begins and/or ends for appropriate registration of printing as well as correct encoding of the RFID inlay 302. It will also be appreciated that throughout this specification "sense mark" shall be read broadly and may include any mark, indicia, depression, hole, protrusion, bulge, convexity, protrusion, protuberance, bump, ridge, substance, and/or material on or contained within media 20 used to indicate the proper location for the encoding, programming, printing, and/or cutting of media 20. In one embodiment, a sense mark in the form of a protrusion of a chip associated with an RFID device is provided.

The thermal printing area 344 may be printed with the terms of use of the selected meal plan, and or any other additional information which the issuing institution wants to convey. It will be appreciated that while this embodiment utilizes sense marks on the back layer, in other embodiments they may be provided on the front layer. Similarly, in certain other embodiments there may be no sense marks.

In some applications, where the plies of media 20 are releasably attached, the media may be used to create two or more documents. For example, on a first ply of media 20, in the form of an RFID label, information for a shipping label may be printed, and on a second ply, in the form of a liner, information for a packing slip may be printed.

It will be appreciated that, such dual-sided thermal RFID labels have many advantages over the prior art RFID labels. For example, to retain a record of what has been printed an encoded on a prior art RFID label, many prior art applications print such a record on a small portion of the face of the label for later removal. Typically, removal of the small record portion is facilitated by an additional die-cut to the face of the label. The die-cutting and removal of this record limits the label size and often damages the inlay. By allowing the record to be printed on the liner, the present invention over comes problems presented by the prior art RFID labels.

In the foregoing description, various features are grouped together in a single embodiment for the purpose of streamlining the disclosure. Likewise, various features are described only with respect to a single embodiment in order to avoid undue repetition. This method of disclosure is not to be interpreted as reflecting that the claimed embodiments should have more or less features than are expressly recited in each claim. Rather, as the following claims reflect, inventive subject matter lies in more or less than all features of a single disclosed embodiment. Thus the following claims are hereby incorporated into the description of the embodiments, with each claim standing on its own as a separate exemplary embodiment.

What is claimed is:

1. A dual-sided direct thermal printer comprising:
   a first thermal print head positioned on a first side of a media feed path;
   a second thermal print head positioned on a second side of the media feed path, opposite the first side;
   a RFID encoder positioned on either the first or second side of the media feed path, wherein the media feed path is dimensioned to receive a dual-sided direct thermal image element equipped with a RFID device; and
   a communication module operable to receive data for printing and encoding onto a dual-sided direct thermal image element equipped with a RFID device that is positioned along the media feed path.

2. A dual-sided direct thermal printer according to claim 1, further comprising a processor configured to process the received data prior to printing by the first and second thermal print heads and encoding by the RFID encoder.

3. A dual-sided direct thermal printer according to claim 1, further comprising a function switch configured to control printing of the received data by the first and the second thermal print heads and to control the encoding of the received data by the RFID encoder.

4. A dual-sided direct thermal printer according to claim 3, wherein the function switch is configured to select a portion of the data for encoding on an RFID device by the RFID encoder.

5. A dual-sided direct thermal printer according to claim 4, wherein the selected portion of the data comprises a unique number.

6. A dual-sided direct thermal printer according to claim 3, further comprising a buffer operable to store data, wherein the function switch is configured to control printing and encoding of the buffered data by the first and the second thermal print heads and the RFID encoder.

7. A dual-sided direct thermal printer according to claim 5, wherein the function switch is configured to select a portion of buffered print data for encoding on an RFID device by the RFID encoder.

8. A dual-sided direct thermal printer according to claim 1, further comprising:
   a first platen positioned on the first side of the media feed path; and
   a second platen positioned on the second side of the media feed path, wherein the first and second are operable to guide a dual-sided direct thermal image element along the media feed path.

9. A RFID enabled dual-sided direct thermal printer according to claim 3, further comprising a sensor positioned on one of the first or second sides of the media feed path.

10. A RFID enabled dual-sided direct thermal printer according to claim 9, wherein the sensor is operable to detect an attribute of a RFID enabled dual-sided direct thermal image element.

11. A RFID enabled dual-sided direct thermal printer according to claim 10, wherein the detected attribute is a sense mark.

12. A RFID enabled dual-sided direct thermal printer according to claim 10, wherein the detected attribute is used to determine a location on the RFID enabled dual-sided direct thermal image element on which to perform a printer function.

13. A RFID enabled dual-sided direct thermal printer according to claim 12, wherein the printer function may comprise any of the following: encoding the RFID device; printing the dual-sided direct thermal image element; or cutting the dual-sided direct thermal image element.

14. A RFID enabled dual-sided direct thermal printer according to claim 10, wherein the function switch is configured to direct the printer function to be performed on the determined location.

15. A RFID enabled dual-sided direct thermal printer according to claim 3, further comprising a RFID reader positioned on one of the first or second sides of the media feed path.

16. A RFID enabled dual-sided direct thermal printer according to claim 15, wherein the RFID reader is operable to detect a defective RFID device embedded in a portion of a dual-sided direct thermal image element.

17. A RFID enabled dual-sided direct thermal printer according to claim 16, wherein the function switch is configured to direct at least one of the first and second thermal print heads to print the portion of the dual-sided direct thermal image element with indicia indicating a defective RFID device has been detected.

18. A method of direct thermal printing and encoding, the method comprising:
receiving data by a RFID enabled dual-sided direct thermal printer, the printer comprising a first thermal print head on a first side of a media feed path, a second thermal print head on a second side of the media feed path, and a RFID encoder positioned on one of the first or the second sides of the media feed path; and
identifying a first portion of the received data for printing by the first thermal print head, a second portion of the received data for printing by the second thermal print head, and a third portion of the received data for encoding by the RFID encoder.

19. A method according to claim 18, wherein the printer further comprises a function switch for identifying the first, second and third portions of data.

20. A method according to claim 18, further comprising:
processing the first and the second portions of the received data for printing by the first and second thermal print heads; and
processing the third portion of the received data for encoding by the RFID encoder.

21. A method according to claim 19, wherein the printer further comprises a sensor positioned on one of the first or the second sides of the media feed path, and wherein the method further comprises detecting by the sensor a first location of an attribute on a dual-sided direct thermal image element equipped with an RFID device.

22. A method according to claim 21, further comprising based on the first location of the detected attribute, determining a second location on the dual-sided direct thermal image element on which to perform a printer function.

23. A method according to claim 22, wherein the printer function may comprise any of the following: encoding the RFID device; printing the dual-sided direct thermal image element; or cutting the dual-sided direct thermal image element.

24. A method according to claim 21, wherein the attribute may consist of a sense mark, a hole, a RFID device, a non-printed area, or a preprinted area.

25. A method according to claim 22, further comprising the function switch directing the printer function to be performed on the second location.

26. A method according to claim 19, wherein the printer further comprises a reader positioned on one of the first or the second sides of the media feed path, and wherein the method further comprises detecting by the reader a defective RFID device embedded in a portion of a dual-sided direct thermal image element.

27. A method according to claim 26, the method further comprising the function switch directing printing of indicia that indicates a defective RFID device has been detected on the portion of a dual-sided direct thermal image element in which the defective RFID device is embedded.

\* \* \* \* \*